United States Patent [19]
Horiuchi

[11] Patent Number: 5,413,074
[45] Date of Patent: May 9, 1995

[54] PISTON AND A CONNECTING ROD APPARATUS

[75] Inventor: Shigeaki Horiuchi, Fujisawa, Japan

[73] Assignee: Isuzu Motors, Ltd., Tokyo, Japan

[21] Appl. No.: 280,418

[22] Filed: Jul. 26, 1994

[30] Foreign Application Priority Data

| Jul. 31, 1993 | [JP] | Japan | 5-208358 |
| Jul. 31, 1993 | [JP] | Japan | 5-208360 |
| Aug. 20, 1993 | [JP] | Japan | 5-228180 |
| Oct. 20, 1993 | [JP] | Japan | 5-280530 |

[51] Int. Cl.⁶ .............. F16J 1/14; F16J 1/22; F16J 1/06; F02B 75/32
[52] U.S. Cl. .............. 123/197.2; 123/193.6; 92/216
[58] Field of Search .............. 123/197.3, 197.2, 197.4, 123/193.6; 92/216, 187, 176, 157, 159, 160

[56] References Cited

U.S. PATENT DOCUMENTS

| 2,742,883 | 4/1956 | Smith | 92/157 |
| 3,027,207 | 3/1962 | Meurer | 123/197.2 |
| 3,056,638 | 10/1962 | Hovde | 123/197.2 |
| 4,031,868 | 6/1977 | Karaba et al. | 92/216 |
| 4,794,848 | 1/1989 | Melchior | 92/160 |
| 5,086,736 | 2/1992 | Wiemann | 92/159 |
| 5,115,725 | 5/1992 | Horiuchi | 92/187 |
| 5,179,916 | 1/1993 | Schonfield | 123/193.6 |
| 5,307,732 | 5/1994 | Berlinger | 123/193.6 |

*Primary Examiner*—Tony M. Argenbright
*Assistant Examiner*—M. Macy
*Attorney, Agent, or Firm*—John E. Toupal; Harold G. Jarcho

[57] ABSTRACT

A groove in a direction of a crank shaft is provided in an inner surface of a top wall of a cup-shaped inner sleeve. The groove provides a stop for a semicylindrical slidable guide member that cooperates with a cylindrical concave portion of a cylindrical member to smoothly guide oscillation of a pair of arms at a small end portion of a connecting rod. Further, the slidable guide member allows relative sliding movement of the small end portion of the connecting rod in the direction of a crank shaft but inhibits relative rotation along the center axis of the piston.

18 Claims, 8 Drawing Sheets

PISTON AND A CONNECTING ROD APPARATUS

BACKGROUND OF THE INVENTION

The present invention relates generally to internal combustion engines and, more particularly, to a piston and a connecting rod construction for use in an internal combustion engine.

According to a piston and connecting rod construction disclosed in Japanese Patent Laid-Open No. 4(1992)-112953, an oscillating center of a connecting rod with respect to a crown portion of a piston moves considerably closer to a crown surface of the piston than was the case with prior constructions. Accordingly, the length of an arm of a crank shaft and that of the connecting rod can be lengthened by an amount that provides an oscillating center of the connecting rod closer to the crown surface of the piston. Consequently, without changing dimensions of cylinder block displacement increases are obtained in power output of the engine.

However, the aforementioned piston and connecting rod construction establishes a configuration in which the piston may move slightly toward a small end portion of the connecting rod in a direction of a crank shaft but may not be rotated about the center axis of the piston. These factors complicate assembly and disassembly of the piston and connecting rod. Further, since clearance between a a constituent slide member and a small end portion of the connecting rod varies with the degree of tightening of an annular retainer threadedly fitted into a skirt portion of the piston, proper fastening of the components is very tedious.

The object of the present invention, therefore, is to provide a piston and a connecting rod construction which is simple to assemble.

SUMMARY OF THE INVENTION

According to the invention, a groove in a direction of a crank shaft is provided in an inner surface of a top wall of a cup-shaped inner sleeve. The groove provides a stop for a semicylindrical slidable guide member that cooperates with a cylindrical concave portion of a cylindrical member to smoothly guide oscillation of a pair of arms at a small end portion of a connecting rod. Further, the slidable guide member allows relative sliding movement of the small end portion of the connecting rod in the direction of a crank shaft but inhibits relative rotation along the center axis of the piston. Thus, no positional displacement between internal oil passages of the connecting rod and the slidable guide member occurs.

The cylindrical member is fitted into the inner sleeve and fastened thereon by a retaining ring engaged within an annular groove provided in an outer surface of the cylindrical member and an annular groove in an inner surface of the inner sleeve. When the retaining ring is to be removed, a slit extending through the sleeve and communicating with the groove therein accommodates a tool that can urge the retaining ring diametrically inwardly into a release position. A plurality of diametrically inwardly protruding protrusions on an inner surface of a piston skirt portion support a lower portion of the cylindrical member. Because the end of the connecting rod and the inner sleeve are retained by a single retaining ring preliminary assembly is simple, and the outer peripheral surface of the piston is less damaged.

DESCRIPTION OF THE DRAWINGS

These and other objects and features of the invention will become more apparent upon a perusal of the following description taken in conjunction with the accompanying drawings wherein:

In FIGS. 1, 2, 6, 7, 12 and 13, the hatching of the crown portion of the piston and the skirt portion has been omitted.

DESCRIPTION OF THE PREFERRED EMBODIMENTS

Figure 1:
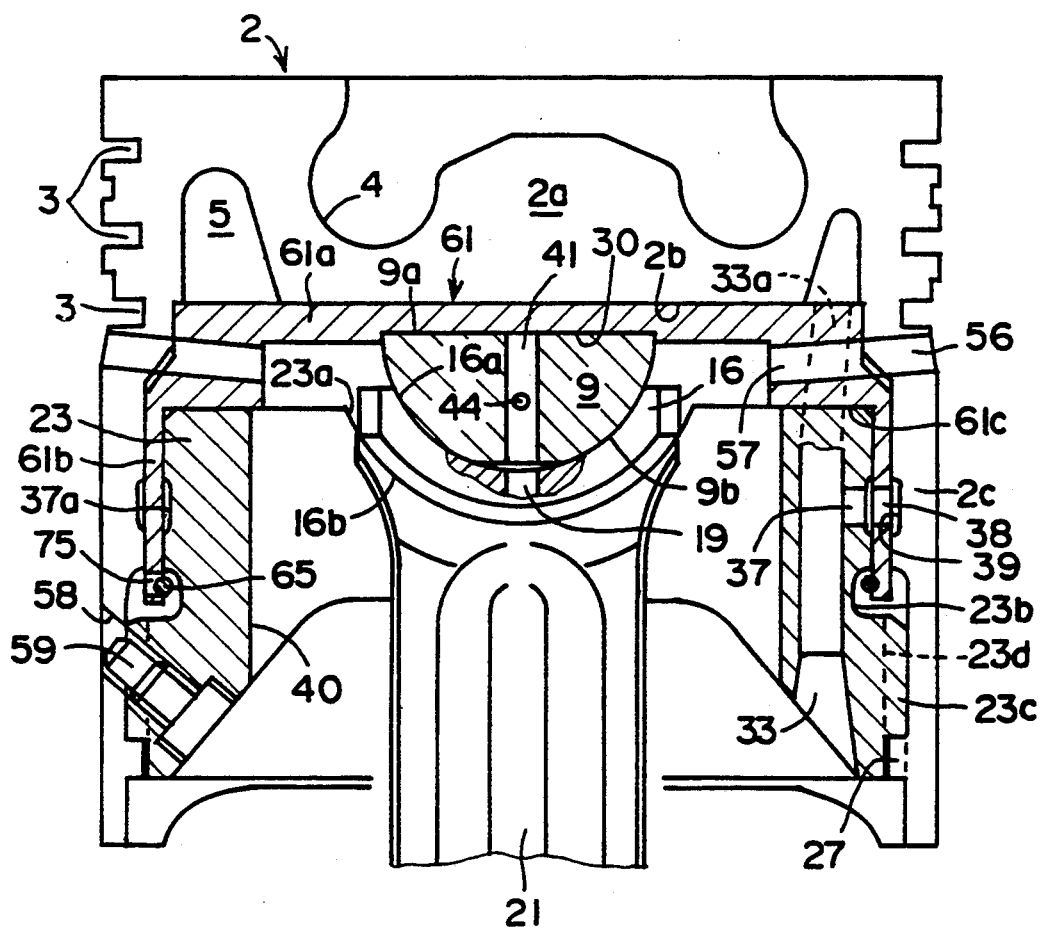
FIG. 1 is a side sectional view of a piston and connecting rod assembly according to the present invention.
Figure 2:
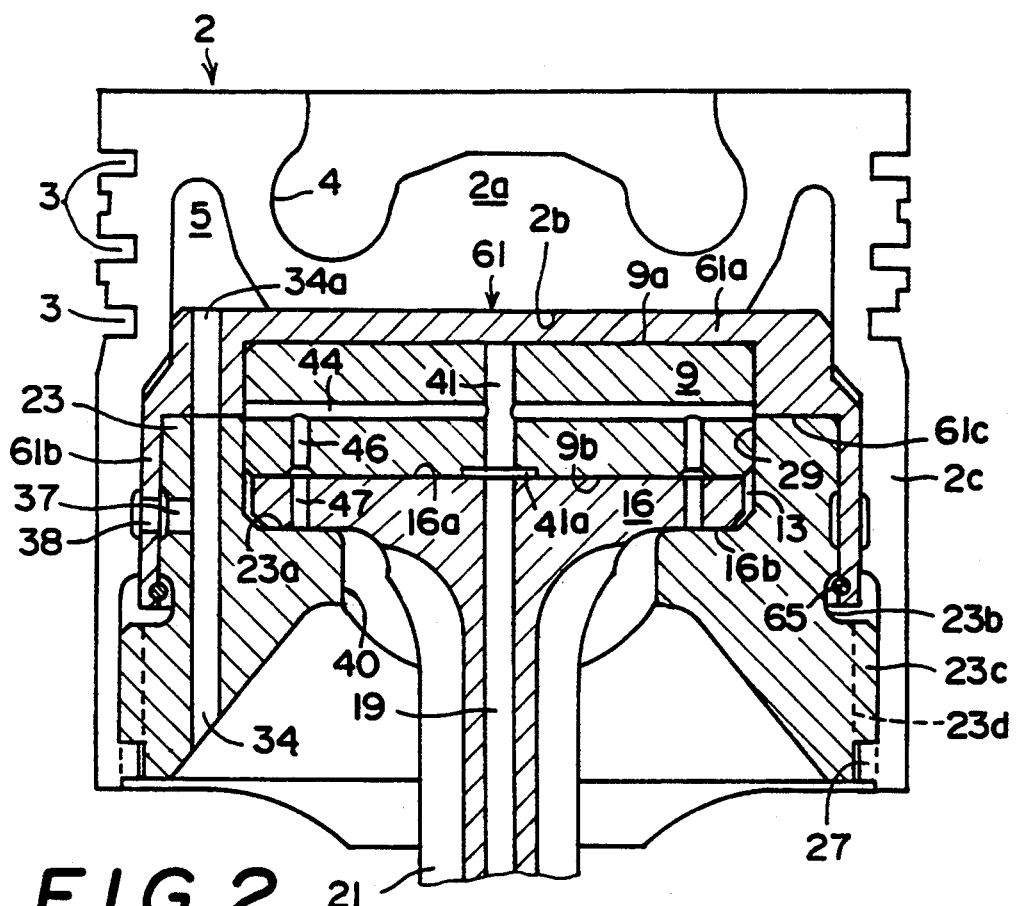
FIG. 2 is a front sectional view of the assembly shown in FIG. 1.

As shown in FIGS. 1 and 2, a piston 2 includes a crown portion 2a defining a combustion chamber 4 in the form of an asymmetrical depression. Formed in the upper half portion on the outer surface of the crown portion 2a are a plurality of ring grooves 3. The central portion of the crown portion 2a is downwardly protruded so as to encircle a bottom of the combustion chamber 4 and to provide a planar lower surface 2b. Formed in the lower surface 2b of the crown portion 2a is an annular cooling oil chamber 5 that surrounds the combustion chamber 4. A skirt portion 2c of the piston 2 projects downwardly from a bottom surface 2b of the crown portion 2a and forms a cavity.

A yoke portion at a small end of an integrally formed connecting rod 21 includes a pair of parallel, spaced apart semicylindrical arms 16, each having upwardly directed concave surfaces 16a and downwardly directed convex surfaces 16b. The arms extend in an axial direction of a crank shaft (not shown). Slidably retaining the pair of arms 16 in an oscillatory manner is a semicylindrical member 23 received within an inverted cup-shaped inner sleeve 61. An upper surface 9a of a guide member 9 is slidably engaged with a shallow groove 30 provided in a top wall 61a of the inner sleeve 61. A lower convex surface 9b of the guide member 9 is engaged with the upper concave surfaces 16a of the arms 16.

Figure 4:
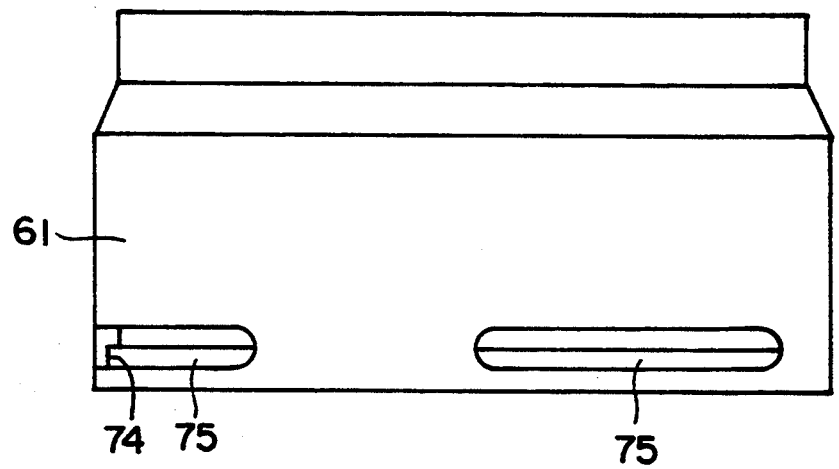
FIG. 4 is a front view of an inner sleeve of the assembly shown in FIG. 1.
Figure 5:
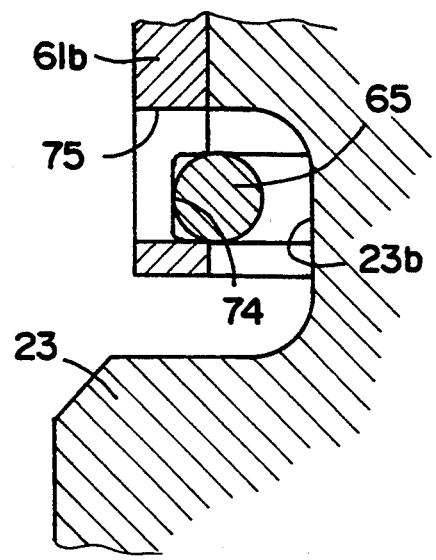
FIG. 5 is a front view showing the coupled together inner sleeve and cylindrical member in an enlarged scale.

An upper end of the cylindrical member 23 engages an intermediate annular shoulder 61c formed on the inner sleeve 61. The intermediate portion of the cylindrical member 23 is held by a retainer ring 65 so as not to slip out of the lower end of the inner sleeve 61. To this end, the retainer ring 65 is resiliently engaged within an annular groove 74 provided in a lower inner end of a peripheral wall 61b of the inner sleeve 61. The retainer ring 65 also engages a deep and wide annular groove 23b provided in an outer surface portion of the cylindrical member 23. For disengaging the retainer ring 65 from the annular groove 74, the peripheral wall 61b of the inner sleeve 61 also is penetrated by a plurality of tool accommodating slits 75 in communication with the annular groove 74 as shown in FIGS. 4 and 5.

Figure 3:
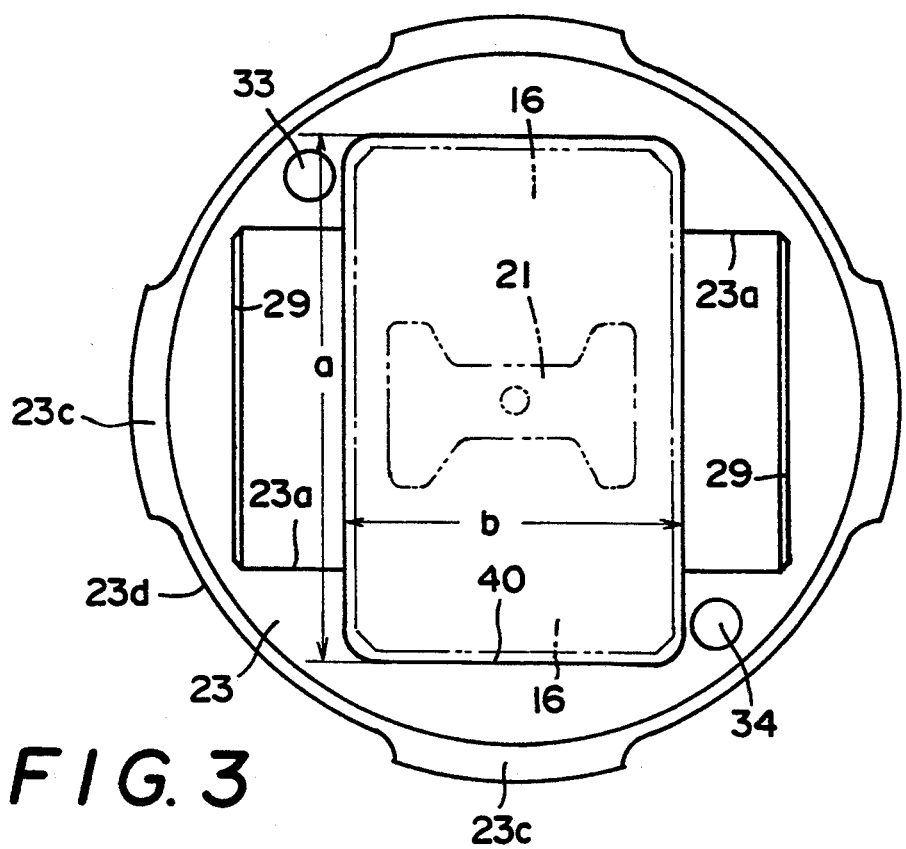
FIG. 3 is a plan view of a cylindrical member of the assembly shown in FIG. 1.

As shown in FIG. 3, the cylindrical member 23 is provided, in an upper end wall thereof, with a rectangular opening 40 which extends perpendicular to the crank shaft. A pair of concave semicylindrical surfaces 23a are formed on both sides in the upper end wall of the cylindrical member 23 and straddle the opening 40. The lower convex surfaces 16b of the arms 16 are slidably supported on the semicylindrical surfaces 23a of the member 23. Formed in the member 23 are sidewalls 29, each intersecting one of the semicylindrical surfaces 23a and separated by a distance greater than a given distance between outer edges of the arms 16. Resultant clearances 13 (FIG. 2) allow relative sliding movement of the connecting rod 21 with respect to the piston 2 in a direction of a crank shaft and absorb any error in a spacing arrangement between a plurality of cylinders disposed on a cylinder block (not shown) and a plurality of pistons 2 connected to a crank shaft (not shown) through connecting rods 21.

A maximum length dimension (a) of the rectangular opening 40 is longer than the given distance separating the outer overall edges of the pair of arms 16, and a width dimension (b) of the opening 40, establishing between the surfaces 23a, a predetermined distance that is wider than the given distance. To mount the pair of arms 16 on the semicylindrical surfaces 23a, the pair of arms 16 are directed lengthwise through the opening 40. Subsequently, the connecting rod 21 is rotated 90° (degrees) to move the arms 16 into engagement with the surfaces 23a.

As shown in FIG. 1, the cup-shaped inner sleeve 61 is fitted in the cavity formed by the skirt portion 2c after the small end portion of the connecting rod 21 has been assembled thereinto. A bottom wall 61a of the inner sleeve 61 is brought into contact with the bottom surface 2b of the crown portion 2a, and the cylindrical member 23 is held between the intermediate shoulder portion 61c of the inner sleeve 61 and a plurality of longitudinal rib projections 27 formed on the skirt portion 2c. The ribs 27 are arranged on the inner surface at the lower end of the skirt portion 2c in circumferentially equally spaced relation and protrude diametrically inwardly.

As shown in FIGS. 2 and 3, an outer diameter of a lower half portion of the cylindrical member 23 is larger than that of an upper half portion thereof. Formed in an outer surface of the member 23 are longitudinally directed and alternating grooves 23d and projections 23c equal in number to the ribs 27. The width of each groove 23d is wider than that of each rib 27.

During assembly of the cylindrical member 23, the grooves 23d are aligned with the ribs 27, and the member 23 is inserted into the skirt portion 2c. Then the member 23 is rotated a predetermined amount to position the projections 23a over the ribs 27 of the skirt portion 2c. As shown in FIG. 1, an antiswivel pin 59 then is threadedly fitted through the member 23 into a pin hole 58 in the skirt portion 2c so as to prevent the member 23 from rotating with respect to the piston 2.

The cooling oil chamber 5 in the crown portion 2a of the piston 2 is partially defined by the bottom wall 61a of the inner sleeve 61. During the operation of the engine, oil discharged from an oil jet (not shown) enters the annular cooling oil chamber 5 via an inlet oil passage 33 of the member 23 and an aligned oil passage 33a in the inner sleeve 61. The oil flows through the chamber 5 and returns to a crank chamber (not shown) via a diametrically opposite outlet oil passage 34a in the inner sleeve 61 and an aligned outlet oil passage 34 in the member 23 as shown in FIG. 2. Proper positions of the respective oil passages 33 and 34 in the member 23 are shown in FIG. 3. The piston 2 is provided under the ring grooves 3 with an oil passage 56 (FIG. 1) extending through the skirt 2c and communicating with an internal portion of the inner sleeve 61 via an oil passage 57 therein.

As shown in FIG. 2, lubricating oil from an oil pump (not shown) lubricates an interface between the lower surface 9b of the guide member 9 and the upper surfaces 16a of the arms 16 via an internal oil passage 19 in the connecting rod 21, a wide inlet hole 41a in the guide member 9, a vertical oil passage 41, oil passages 44 extending radially from opposite sides of the oil passage 41, and an oil passage 46 which terminates at the lower surface 9b. Furthermore, lubrication of an interface between the lower surfaces 16b of the arms 16 and the semicylindrical concave surface 23a of the member 23 is provided via oil passages 47 formed in the pair of arms 16 and communicating with the passages 46.

A portion of the oil directed to the inlet oil passage 33 of the member 23 during operation of the engine lubricates an interface between the peripheral wall 61b of the inner sleeve 61 and the peripheral wall of the member 23 via an oil passage 37 and an annular groove 37a, and further lubricates an interface between the skirt portion 2c and the peripheral wall 61b of the inner sleeve 61 via an oil passage 38 and an annular groove 39. At the same time, a portion of the oil flowing from the cooling oil chamber 5 to the outlet oil passage 34 lubricates an interface between the inner sleeve 61 and member 23 via the oil passage 37 and the annular groove 37a and further lubricates an interface between the skirt portion 2c and the inner sleeve 61 via the oil path 38 and the annular groove 39. Accordingly, when the piston 2 impinges upon a cylinder as the engine operates, shock caused by diametrical relative movement between the skirt portion 2c and the inner sleeve 61 and shock caused by diametrical relative movement between the inner sleeve 61 and the cylindrical member cavity 23 are relieved by films of the aforementioned lubricating oil, and thus suppressing knocks caused by the shock.

Figure 6:
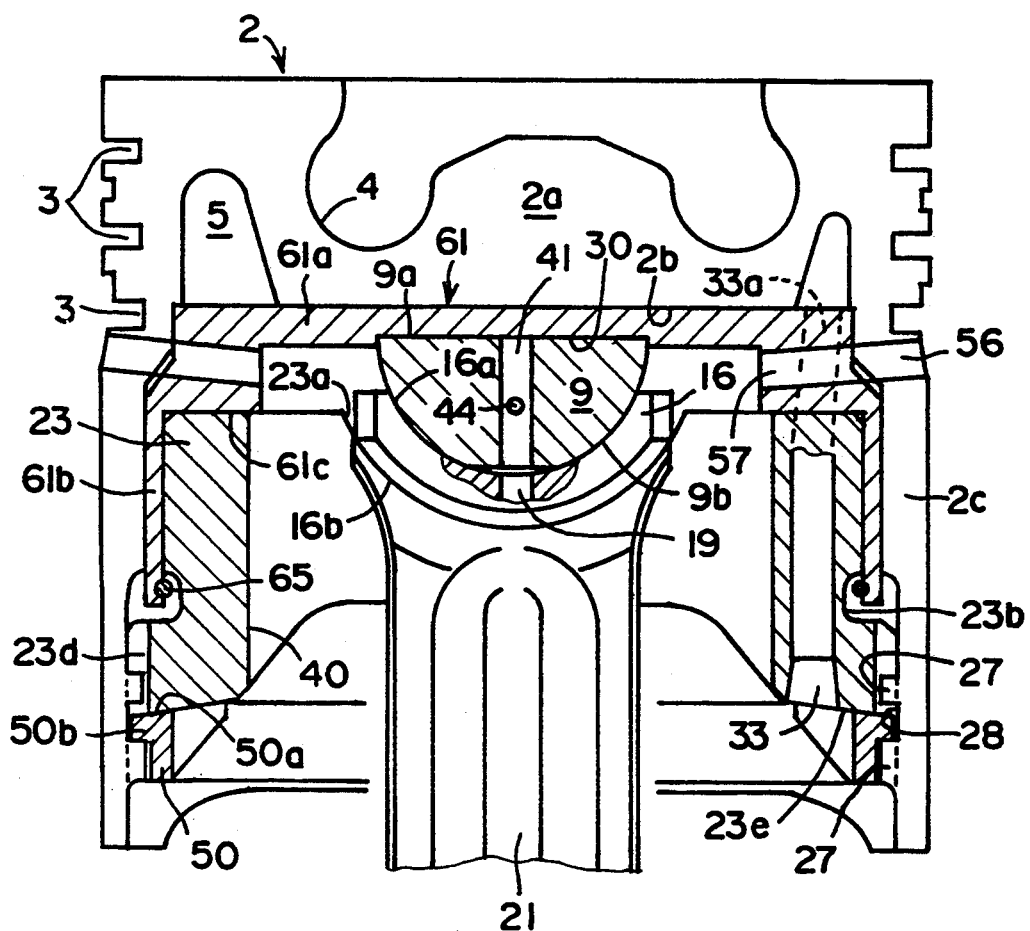
FIG. 6 is a side sectional view of a piston and a connecting rod assembly according to a first modified embodiment of the present invention.

In the embodiment shown in FIG. 6, a lower end of the cylindrical member 23 is formed with a conical surface 23e inclined downwardly and outwardly. An inner surface of the skirt portion 2c of the piston 2 is provided with an annular groove 28. Since the groove 28 is shallow, it is not continuous annularly but merely extends through the rib projections 27. An outwardly directed flange portion 50b on an upper half portion of an elastic ring 50 is engaged in the annular groove 28 of the skirt portion 2c. The elastic cut ring 50 is formed with an elastic radially directed spreading force. An upper end of the ring 50 is formed with an upwardly and inwardly directed conical surface 50a conforming to the conical surface 23e of the member 23.

During assembly, the elastic cut ring 50 is contracted and inserted by the ribs 27 into the skirt portion 2c until the flange portion 50b expands into the groove 28 and the conical surface 50a engages the conical surface 23e of the member 23. As the elastic cut ring 50 spreads open its conical surface 50a moves diametrically outwardly along the conical surface 23e of the cylindrical member 23. Accordingly, the member 23 is forced upwardly to force its upper end against the intermediate shoulder 61c of the inner sleeve 61, and the bottom wall 61a of the inner sleeve 61 is pressed against the lower surface 2b of the crown portion 2a to thereby provide a tight assembly.

Figure 7:
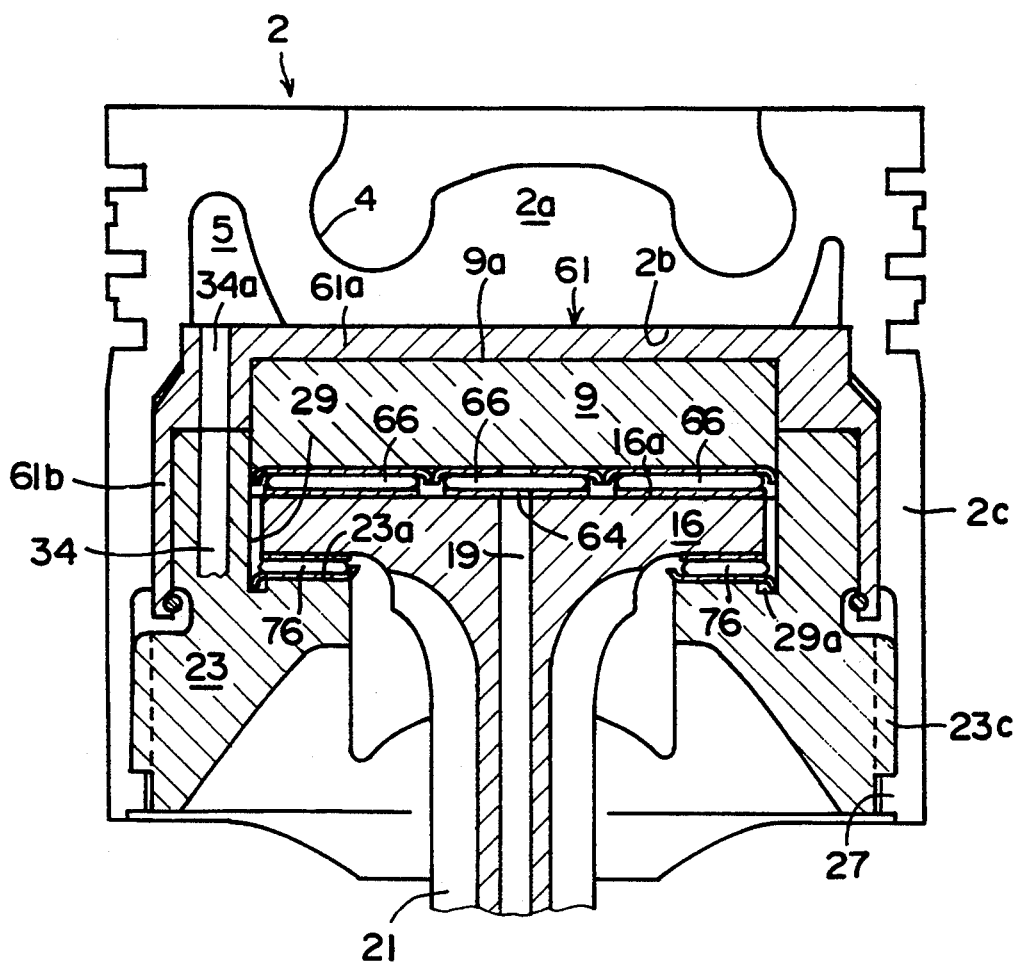
FIG. 7 is a front sectional view of a piston and a connecting rod assembly according to a second modified embodiment of the present invention.
Figure 8:
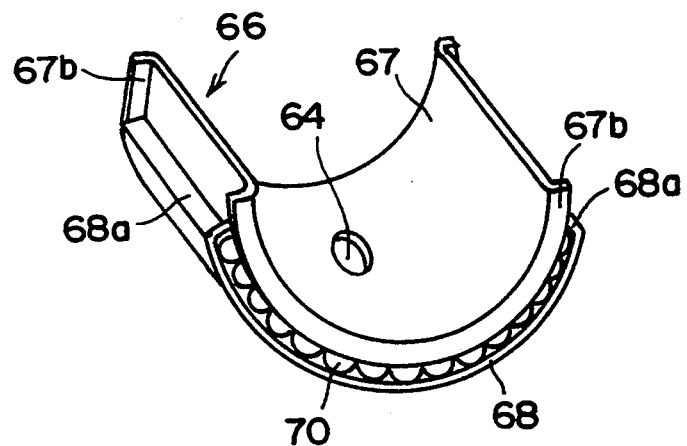
FIG. 8 is a perspective view of a bearing used for the assemblies shown above.
Figure 9:
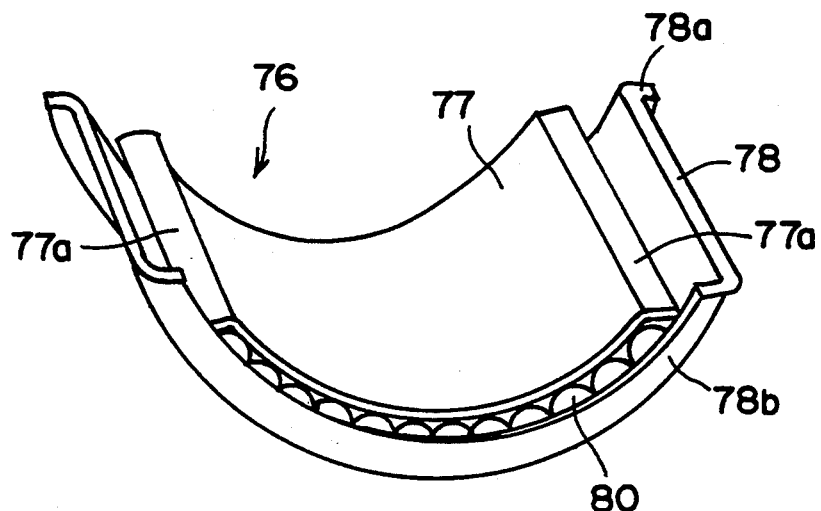
FIG. 9 is a perspective view of a further bearing used for the assemblies shown above.

In the embodiment shown in FIG. 7, roller bearings 66 are relatively oscillatorily supported between the lower surface of the slidable guide member 9 and the upper cylindrically concave surfaces of the pair of arms 16. Also, the lower cylindrically convex surfaces of the arms 16 are oscillatorily supported by roller bearings 76 on the cylindrically concave upper surface of the cylindrical member 23 which is in turn supported by a plurality of rib projections 27 at the lower end portion of the skirt portion 2c. To prevent the roller bearings 66 and 76 from being raised, known retainers are excluded and, as shown in. FIGS. 8 and 9, rollers 70 are disposed between a first arcuate guide plate 67 and a second arcuate guide plate 68 of the bearings 66. Similarly, rollers 80 are disposed between a first arcuate guide plate 77 and a second arcuate guide plate 78 of the bearings 76. Rolling surfaces of the guide plates 67, 68, 77 and 78 preferably are subjected to a surface setting treatment. Although the roller bearings 66 may be formed as a single unit, it is to be noted that preferably, they are formed as three bearing sections.

Figure 10:
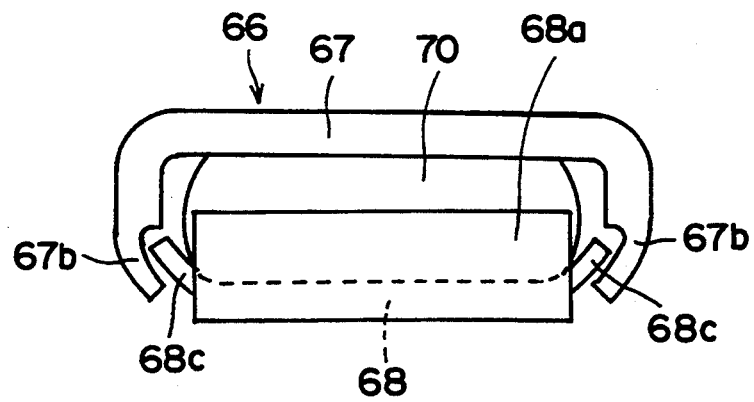
FIG. 10 is a front view of the bearing shown in FIG. 8.

As shown in FIGS. 8 and 10, each roller bearing 66 is configured such that the rollers 70 are sandwiched between the arcuate guide plates 67 and 68 in such a manner that the rollers 70 are not particularly restricted. Both side edges 67b of the guide plates 67 are folded downwardly toward the plates 68 while both side edges 68c of the guide plates 68 are folded upwardly toward the plates 67. In addition end edges 68a of the plates 68 are folded upwardly toward the plates 67. The rollers 70 are retained axially by the side edges 67b and 68c and are retained peripherally by the end edges 68a.

As shown in FIG. 9, the roller bearings 76 are similarly formed with a number of rollers 80 sandwiched between a first arcuate guide plate 77 and a second arcuate guide plate 78 with the rollers 80 not particularly restricted. The guide plate 77 has both end edges 77a folded toward the guide plate 78 so as to peripherally retain the rollers 80. One side edge 78a of the guide plate 78 is folded in a direction opposite to the guide plate 77 and is engaged with a groove 29a (FIG. 7) provided along an end wall 29 of the cylindrically concave surface 23a. The guide plate 78 has its other side edge 78b folded toward the guide plate 77 so as to retain rollers 80 in an axial direction.

As shown in FIG. 7, lubricating oil flows between the rollers 70 via a passage 19 in the connecting rod 21 and an oil port 64 in the guide plate 68. Also, lubricating oil flows to lubricate the peripheral surfaces of the rollers 80 and returns to the crank chamber. Accordingly, the smooth movement of the rollers 70 and 80 is obtained.

Figure 11:
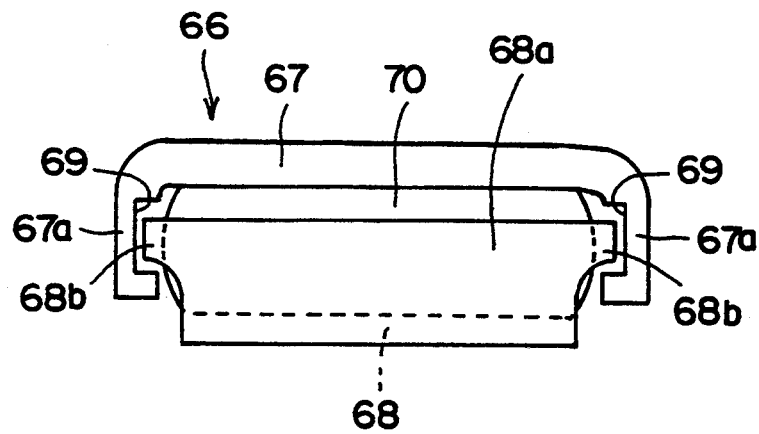
FIG. 11 is a front view showing a modified embodiment of the bearing shown in FIG. 10.

In the embodiment shown in FIG. 11, scattering of the rollers 70 is prevented by forming the roller bearing 66 as a combined assembly between the guide plate 67 and the guide plate 68. More specifically, the guide plate 67 is formed with a guide groove 69 obtained by folding both thin side edges 67a into a C-shape facing the guide plate 68 and both end edges 68a of the guide plate 68 are folded toward the guide plate 67. Protrusions 68b formed on both side edge portions of the end edges 68a of the guide plate 68 project into the guide groove 69 of the guide plate 67. Preferably, the guide plate 68 is fastened to the arms 16 by suitable means, and the guide plate 67 is fastened to the slidable guide member 9 by suitable means. The guide plate 67 and the guide plate 68 are moved relatively in a peripheral direction on the rollers 70. However, as the connecting rod 21 slides, the guide plates 68 and the rollers 70 are not raised from the arms 16. The roller bearing 76 can be substantially similarly configured.

Figure 12:
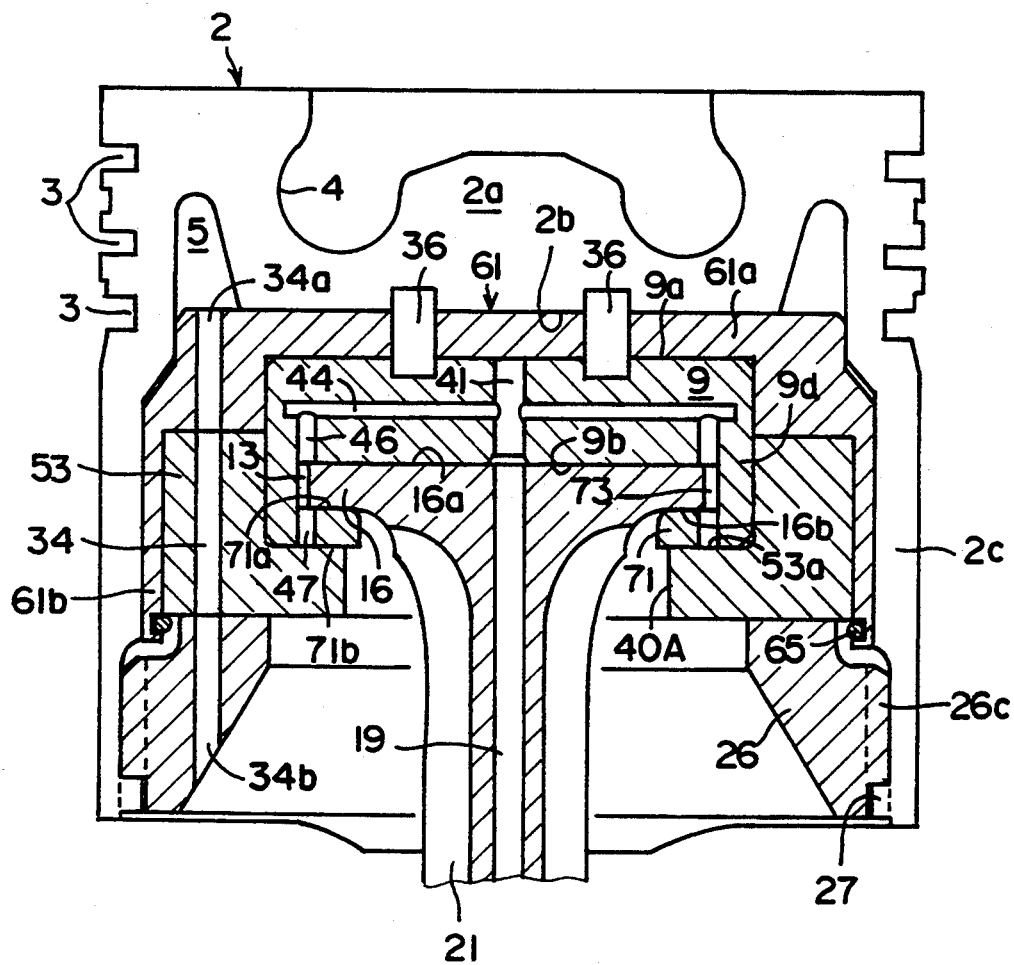
FIG. 12 is a front sectional view of a piston and a connecting rod assembly according to a third modified embodiment of the present invention.
Figure 13:
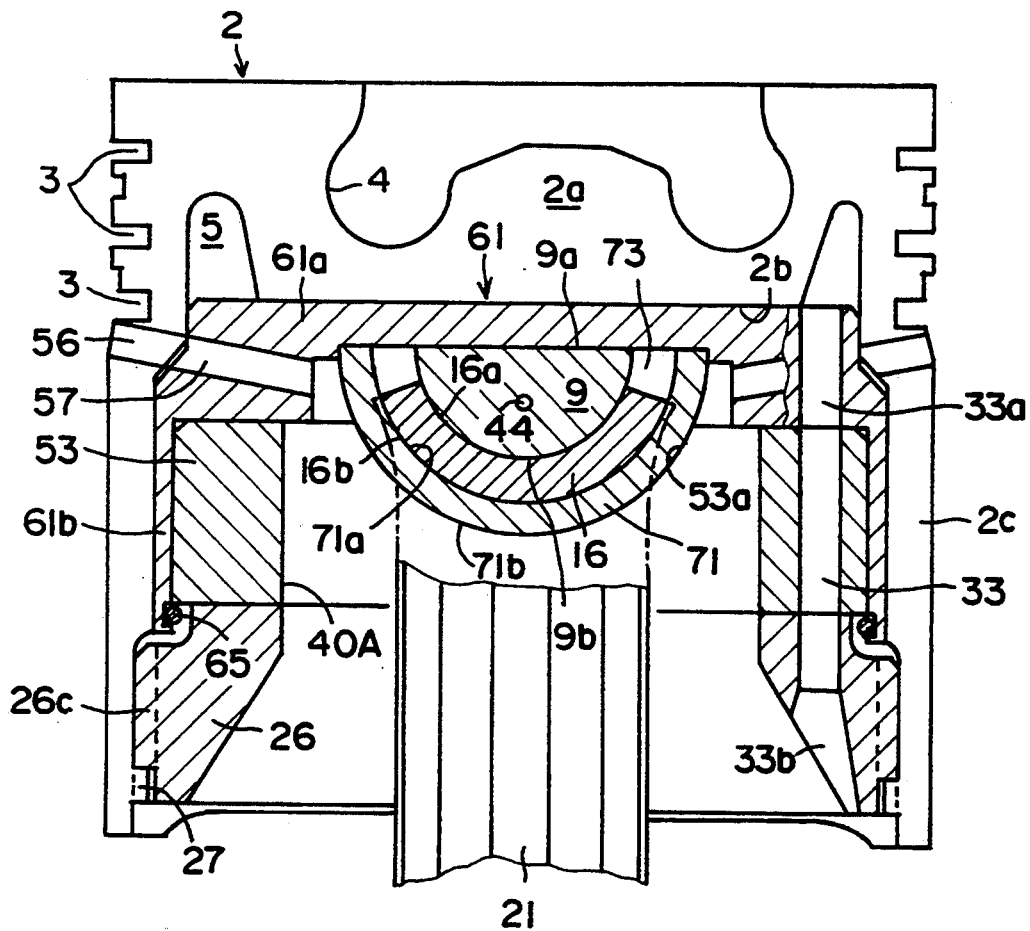
FIG. 13 is a side sectional view of the assembly shown in FIG. 12.
Figure 14:
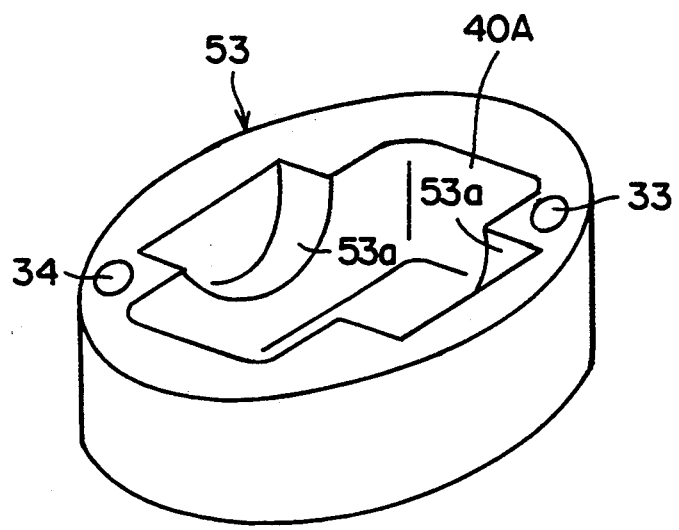
FIG. 14 is a perspective view of a cylindrical member in the assembly shown in FIG. 13.

In the embodiments shown in FIGS. 12–14, the arms 16 are slidably engaged in arcuate grooves 73 formed on both ends of the slidable guide member 9 to thereby enhance the flexural rigidity of the arms 16. Each arcuate groove 73 is defined by a reentrant cover portion 71 having an arcuate shape and integral with an end wall 9d of the slidable guide member 9. The lower surfaces 16b of the arms 16 are engaged with the upper surfaces 71a of the cover portions 71. Lower surfaces 71b of the cover portions 71 are supported on cylindrically concave portions 53a of a cylindrical member 53. The cover portions are separated by a gap so as to allow a swing movement of the connecting rod 21. Since the pair of arms 16 are sandwiched between upper and lower surfaces 9b, 71a of the guide member 9, a sliding clearance therebetween is determined according to machining accuracy, thereby facilitating assembly. In addition, the flexural rigidity of the arms 16 with respect to the inertia force of the piston 2 is improved.

A flat upper surface 9a of the slidable guide member 9 engages a bottom wall 61a of the inner sleeve 61, and the crown portion 2a, bottom wall 61a and guide member 9 are joined by two vertical connecting pins 36 as shown in FIG. 12. Lubricating oil from an oil pump (not shown) lubricates an interface between the lower surface 9b of the guide member 9 and the upper surfaces 16a of the arms 16 via an internal oil passage 19 in the connecting rod 21, an oil passage 41 in the guide member 9, oil passages 44 extending laterally from the oil passage 41, and downwardly directed oil passages 46. The flowing oil further lubricates an interface between the lower surfaces 16b of the arms 16 and the upper surfaces 71a of the cover portions 71 via a clearance 13 between the end walls 9d and the ends of the arms 16.

As shown in FIG. 14, an opening 40A and a pair of concave semicylindrical surfaces 53a of the cylindrical member 53 are substantially similar to those of the cylindrical member 23 shown in FIGS. 1 and 2. However, the length of the cylindrical member 53 is shorter than the length of the member 23. As shown in FIG. 13, the cylindrical member 53 is held by a retainer ring 65 engaged in a groove at the lower end of a wall portion 61b of an inner sleeve 61. The inner sleeve 61 is fitted into the skirt portion 2c of the piston 2 after the small end portion of the connecting rod 21 and the cylindrical member 53 have been assembled. Supporting the cylindrical member 53 is a retaining tube 26 fitted into the skirt portion 2c. The retaining tube 26 has the projections 26c supported on the ribs 27 of the skirt portion 2c in a manner similar to that shown for the member 23 in FIG. 1. Formed in the retaining tube 26 is an oil passage 33b communicating with an inlet oil passage 33 in the cylindrical member 53 and an oil passage 34b communicating with an outlet oil passage 34 in the member 53.

Obviously, many modifications and variations of the present invention are possible in light of the above teachings. It is to be understood, therefore, that the invention can be practiced otherwise than as specifically described.

What is claimed is:

1. Internal combustion engine apparatus comprising:
   piston means having a crown portion with a bottom surface, and a skirt projecting therefrom and defining a cavity;
   a cup shaped sleeve retained in said cavity and having a bottom wall engaging said bottom surface and a sidewall engaging said skirt;
   a connecting rod having at one end a yoke portion with a pair of parallel, spaced apart, semicylindrical arms each having an upwardly directed concave surface and a downwardly directed convex surface;
   a guide member slidably retained between said bottom wall and said concave surfaces;
   a substantially cylindrical member projecting into said sleeve, fixed to said skirt, and defining spaced apart concave semicylindrical surfaces each engaging one of said convex surfaces; and
   sleeve retainer means fixing said sleeve to said cylindrical member.

2. Apparatus according to claim 1 wherein said cylindrical member defines a central opening having a given maximum dimension, said central opening is intersected by said concave surfaces, said arms have outer edges separated by a given distance less than said given maximum dimension, and said concave surfaces are spaced apart by a predetermined distance less than said given distance.

3. Apparatus according to claim 2 wherein said cylindrical member defines parallel spaced apart sidewalls, each intersecting one of said semicylindrical surfaces; and said sidewalls are separated by a distance greater than said given distance.

4. Apparatus according to claim 3 wherein said opening is rectangular with a length equal to said given maximum dimension and a width equal to said predetermined distance.

5. Apparatus according to claim 1 wherein said sleeve retainer means comprises a retainer ring engaged in adjacent annular grooves formed in, respectively, an inner surface of said sleeve and an outer surface of said cylindrical member.

6. Apparatus according to claim 5 wherein at least one slit extends through said sleeve into said groove formed in an inner surface thereof.

7. Apparatus according to claim 1 wherein said guide member is engaged in a groove formed in a bottom wall of said sleeve, and said bottom wall has an internal shoulder portion engaging said cylindrical member.

8. Apparatus according to claim 1 wherein a lower end of said skirt defines inwardly directed, circumferentially spaced apart projections; and an outer surface portion of said cylindrical member defines grooves for receiving said projections during relative axial movement between said cylindrical member and said skirt.

9. Apparatus according to claim 1 including a threaded pin engaged between said cylindrical member and said skirt.

10. Apparatus according to claim 1 wherein said cylindrical member and said sleeve define communicating primary inlet and outlet oil passages extending between said cavity and said crown portion; and auxilliary oil passages extending, respectively, between said primary inlet and outlet oil passages and an inner surface of said skirt.

11. Apparatus according to claim 10 wherein said rod defines an axially directed oil passage, said guide member defines radially directed oil passages communicating with said axially directed oil passage and an interface between said guide member and said concave surfaces.

12. Apparatus according to claim 11 wherein each of said arms defines an oil passage communicating between said interface between said guide member and said concave surface and an interface between said semicylindrical surfaces and said convex surfaces.

13. Apparatus according to claim 1 wherein engagement between said semicylindrical surfaces and said convex surfaces is provided by, respectively, intermediate first and second roller bearing means, and including a third roller bearing means engaged between said bottom surface and said concave surfaces.

14. Apparatus according to claim 13 wherein each of said first, second and third roller bearing means comprises first and second spaced apart and juxtaposed, arcuate plates; and a plurality of rollers disposed between said first and second plates.

15. Apparatus according to claim 14 wherein opposite ends of said first plates project transversely toward said second plates, and opposite side edges of said second plates project transversely toward said first plates thereby forming arcuate housings retaining said rollers.

16. Apparatus according to claim 15 wherein said opposite side edges of said second plates define guide grooves, and each of said opposite ends of said first plates define lateral projections engaged with said guide grooves.

17. Internal combustion engine apparatus comprising:
   piston means having a crown portion with a bottom surface, and a skirt projecting therefrom and defining a cavity, an inner surface portion of said skirt defining an annular groove;
   a cup shaped sleeve retained in said cavity and having a bottom wall engaging said bottom surface and a sidewall engaging said skirt;
   a connecting rod having at one end a yoke portion with a pair of parallel, spaced apart, semicylindrical arms each having an upwardly directed concave surface and a downwardly directed convex surface;
   a guide member slidably retained between said bottom wall and said concave surfaces;
   a substantially cylindrical member projecting into said sleeve and defining spaced apart concave semicylindrical surfaces each engaging one of said convex surfaces;
   sleeve retainer means fixing said sleeve to said cylindrical member; and an elastic ring having a diameter greater than said inner surface portion of said skirt, said elastic ring being contractible to allow passage by said inner surface portion and circumferentially expandable into said annular groove.

18. Internal combustion engine apparatus comprising:

piston means having a crown portion with a bottom surface, and a skirt projecting therefrom and defining a cavity;

a cup shaped sleeve retained in said cavity and having a bottom wall engaging said bottom surface and a sidewall engaging said skirt;

a connecting rod having at one end a yoke portion with a pair of parallel, spaced apart, semicylindrical arms each having an upwardly directed concave surface and a downwardly directed convex surface;

a guide member slidably retained between said bottom wall and said concave surfaces; said guide member defining spaced apart, parallel and juxtaposed arcuate grooves, each receiving one of said arms and slidably engaging said concave and convex surfaces thereof; and a cylindrical means projecting into said sleeve and engaged between said guide member and said skirt.

* * * * *